United States Patent Office 2,833,640
Patented May 6, 1958

2,833,640
METHOD AND COMPOSITION FOR AMMONIATION OF SOILS

Frederick C. Bersworth, Framingham Center, Mass., assignor to The Dow Chemical Company, Midland, Mich., a corporation of Delaware No Drawing. Application September 10, 1954
Serial No. 455,343

9 Claims. (Cl. 71—27)

This invention relates to a method and composition for the ammoniation of soils, and in particular is concerned with the application of certain polynitrile compositions to soils to bring about conditions wherein a controlled liberation of ammonia occurs for fumigation of those soils.

In many agricultural establishments it has been found that the repeated use of copper insecticides had brought about a condition wherein an excess amount of copper is present in the soil as the inorganic compound used as the insecticide. Generally no serious deleterious effects result therefrom. However, when the soil is treated with certain ingredients, for example ammonia, to kill off insect life harmful to the roots of the plants, or to supply needed ammonia to the soil, reaction between the ammonia and copper occurs to form complex copper-ammonia compounds, which thereby render copper available to the plant and available in such concentration as to produce toxic effects. Also, where copper has been liberally used as an insecticide in certain areas, the toxicity shows in the plants when fertilizers having high nitrogen or ammonia content are used. It is accordingly a fundamental object of the instant invention to provide agents, which, when applied to the soil, will permit a slow, controlled release of ammonia in the soil by which the ammonia requirements of the soil can be satisfied without at the same time inducing the effects of copper toxicity in the plant.

It is another object of the invention to provide a method and composition for bringing about controlled release of ammonia in the vicinity of roots of plants, and at the same time to avoid the increase in the formation of copper ammonia complexes.

It is another object of the invention to provide a composition useful for solubilizing the insoluble inorganic metal compounds found in soils.

Other objects and advantages of the invention will in part be obvious and in part appear hereinafter.

The invention accordingly is based upon the method of bringing about a controlled release of ammonia in soil and the solubilization of insoluble metal compounds, and a composition for so doing which is characterized by the application to the soil in which the plant is growing of a composition containing a compound corresponding to the following general formula:

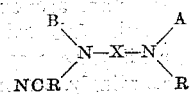

wherein X is an alkylene group which contributes two to three carbon atoms to the chain, such as ethylene, isopropylene, trimethylene, 2,3-butylene, cyclohexylene; R is chosen from the group consisting of methylene, ethylene, isopropylene, trimethylene, and is preferably methylene; and A is chosen from the group consisting of —$CH_2COOM$, —$CH_2CH_2OH$ or longer chain β-hydroxy alkyl group, M being hydrogen, alkali metal or ammonium, and B may be A or RCN. In a variation of the composition it may be mixed with about one percent to fifty percent by weight of ethylenediamine tetraacetic acid; ethanolethylenediamine triacetic acid; diethanolethylenediamine diacetic acid. The full composition may include any organic or inorganic carrier, the organic carriers being fertilizer materials, humus, compost, garbage and sewage residues, peat moss, and the inorganic carriers being inorganic chemical fertilizers, inert materials such as sand, vermiculite, lime, calcium phosphate or ground phosphate rock and similar mineral fillers. Various other nitriles having similar structural entities in the molecules may be used, but for purposes of this invention those nitriles are preferred which are characterized by containing a plurality of nitrile groups appropriately disposed with reference to one another so that upon hydrolysis they not only give ammonia, but they also generate compounds having a structure which is characteristic of a very effective class of chelating agents. For example, with an agent such as ethanolethylenediamine tri-methylenenitrile, one or more of the nitrile groups can be present in the partial or completely hydrolyzed form so that all hydrolysis products up to and including the tri-acid or salts of the acid may be present. The presence of such acids or salts, which are chelating agents, gives in the presence of moisture and metal ions, the metal chelate of the metal which forms the most stable chelate. If, for example, copper, zinc and ferric iron are present, the ferric iron will be preferentially chelated. This new soluble form of iron will then be available and valuable for maintaining and satisfying the nutritional requirements of the plant for iron. Experience indicates that the preferential chelation of the iron occurs most effectively in acid soils.

Accordingly, the organic compounds of the nitrile family of the type herein described function in a dual capacity in that they provide for controlled release of ammonia and elimination, under proper conditions, of trace metal deficiencies, for example, iron. The compounds in accordance with the invention may be applied directly by broadcasting on the soil followed by a disking of the soil to work them beneath the surface, or they can be applied to the soil in a carrier which may be functional, such as a fertilizer, or an inert carrier such as sand, so that they are available for hydrolysis in the soil. Generally it is preferable to use a functional carrier such as phosphate rock, for the mixture of compounds added thereto not only renders calcium available to the plants, but also releases phosphoric acid and makes it available.

The mechanism by which these nitrile compounds function as they are applied to the soil and hydrolyzed by moisture in the soil may be represented substantially as follows:

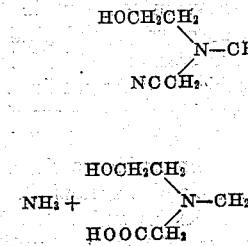 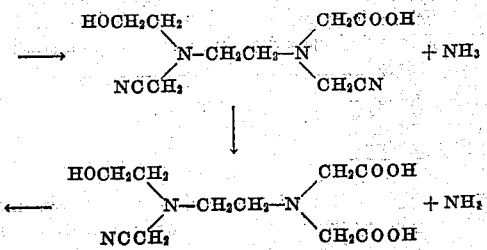

It will be seen that the nitrile groups on the compounds are hydrolyzed to form acid groups and ammonia. The ammonia is nascent and functions not only to fumigate the soil, but also to be available to the plant for satisfaction of nutritional requirements.

The residual compound left in the soil after hydrolysis of the nitrile group carries structural entities such that complex compounds with metal ions are formed thereby diminishing the possible toxic effect. At the same time, metals in the soil in insoluble inorganic form are brought into a complex form and as such a minute trace of metal is made available in the soil for assimilation by the plant.

Examples of specific compositions which can be made in accordance with this invention and applied to the soil to obtain the effects desired are as follows:

Example 1

A nitrogenous organic fertilizer, dried to remove moisture to a level below about 5 percent, was blended with 5 percent by weight of ethanolethylenediamine triacetonitrile. Application to the soil, in usual quantities as determined by the fertilizer requirements, makes the amount of fertilizer used about one pound to 10 square feet, so that about 2/10 pound per 10 square feet of the nitrile is applied to the soil.

Example 2

When the compound is incorporated into a bulk soil conditioning agent such as the acrylonitrile soil conditioning materials, a modified application results. Ethanolethylenediamine triacetonitrile is blended with the acrylonitrile conditioner in a proportion such that about 1/10 pound to about 5/10 pound per square foot of the soil is applied.

Example 3

Ordinary sand of about the grade used for forming mortar mixes is blended with ethanolethylenediamine triacetonitrile and the mixture then applied to the soil and worked in. The ratio in which the acetonitrile may be blended with the sand may be varied to suit the convenience of the commercial operation involved. Generally, however, a dilution of at least one part of sand to one part of the acetonitrile is desirable, because it then becomes easier to control the exact rate of application of the compound to the soil.

Example 4

Compositions corresponding to those described in Examples 1–3 are made up including an amount of polycarboxylic acid corresponding to the nitrile used. The preferred polycarboxylic acid is that which is the end product of the hydrolysis of the nitrile. Thus the formulations become

|  | Parts wgt. |
| --- | --- |
| (1) Organic fertilizer | 80–90 |
| Ethanolethylenediamine triacetonitrile | 10–5 |
| Ethanolethylenediamine triacetic acid, sodium salt | 10–5 |
| (2) Soil conditioning agent | 50–90 |
| Ethanolethylenediamine triacetonitrile | 25–5 |
| Ethanolethylenediamine triacetic acid, sodium salt | 25–5 |
| (3) Sand | 50 |
| Ethanolethylenediamine triacetonitrile | 25 |
| Ethanolethylenediamine triacetic acid, sodium salt | 25 |

In those compositions where the acid or salt corresponding to the end product of hydrolysis is used, a solubilizing effect on the metal compounds in the soil is brought about substantially immediately upon application. The effect of the chelating agent in the soil is prolonged by the presence of the nitrile which gradually hydrolyzes to form the free acid.

It is possible to use the nitrile, and its hydrolysis products in any degree. That is, a mixture of the tetra nitrile, trinitrile-monoacid, dinitrile-diacid, mononitrile-triacid, and tetra acid may be applied to the soil. Also the particular polycarboxylic acid used need not correspond to the final hydrolysis product; thus the tetraacetonitrile may be mixed with ethanolethylenediamine, triacetic acid or the ethanolethylenediamine acetonitriles may be mixed with ethylenediamine tetraacetic acid.

In each instance, the material applied to the soil was worked in by cultivating or disking in conventional style. Over the weeks immediately following the application, normal rainfall provided moisture for hydrolysis of the nitrile and a gradual fumigation of the soil was obtained. The effect lasts substantially through a three to four month growing season.

In one case several test areas of ¼ acre each were laid out in a field planted with celery which was showing serious copper toxicity. Application of the nitriles as set forth above produced within two weeks a noticeable improvement in the condition of the plants. That is, ammonia released became available slowly to the plants; the chelating agents formed in the hydrolysis reacted with copper in the soil to render it essentially unavailable to the plants. Where the plants show copper toxicity, the phenomenon is often called "copper induced" chlorosis, the application of the nitrile as described is particularly efficacious because copper catalyzes the hydrolysis of the nitrile. Hence, in the soil the nitrile is hydrolyzed at a rate accelerated by the copper to yield ammonia and a chelating agent. As hydrolyzed the chelating agent reacts with copper in the soil and binds it in non-ionic form.

In general, it is found that the leaves from chlorotic trees and plants have a low iron content and are otherwise like chlorotic citrus leaves grown in calcareous soil. It is apparent that the disorder is due to a soil condition which reduces the iron uptake of the plant. High concentrations of such metals as zinc, manganese and in particular copper are known to produce iron chlorosis symptoms in plants.

It is not unusual in an established citrus grove to find a very high concentration in the top soil, that is, the top 6-inch layer, of 30 to 50 parts per million of copper. Substantially smaller amounts are found in young groves and very minute traces only in virgin soils; that is, they will contain less than one part per million.

In general, it may be said that in an acid soil, substantial chlorosis will occur when the total copper content of the soil approaches about 150 to 200 parts per million, which figure indicates about 300 pounds per acre per 6 inches. The copper chlorosis may be reduced and substantially eliminated by the treatment described herein.

When the nitriles are applied to the soil, several effects are detected. Even though the total quantity of nitrile applied may be extremely small, the quantity will be large enough to develop a certain degree of toxicity to bacteria or other micro-organisms. The organic nitriles generally are fairly effective fungicides and also organic nitriles are toxic to animal life in general. This toxicity is readily understandable since the nitriles are organic analogues of inorganic cyanides. Accordingly, when the ethylenediamine tetra nitrile is applied to soil, a very small amount will dissolve in moisture in the soil. Such nitrile, of course, develops physiological activity toward organisms which are present exerting their toxic effect toward living organisms in the medium.

The specific examples are given in terms of results obtained using the ethanol ethylene diamine triacetonitrile. Directly comparable results are obtained with the isopropylene diamine acetonitrile and the corresponding propionic nitriles, as well as the diethanol. This is because the structure of the compound formed upon hydrolysis of the nitrile is such that it can form five and six member rings with metals in the soil medium, as follows:

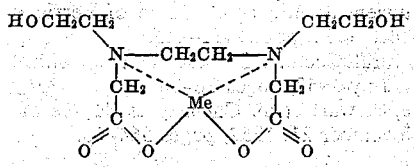

in which Me is a polyvalent metal.

The composition for use with the carrier may be prepared directly from ethylene diamine. By reaction of ethylene diamine with HCN and formaldehyde, the tetraacetonitrile may be formed. The ethanol ethylene diamines are formed readily by reaction with ethylene oxide in accordance with the following scheme:

NH₂CH₂CH₂NH₂

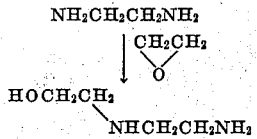

HOCH₂CH₂
  \
   NHCH₂CH₂NH₂

By reaction with two mols of ethylene oxide the diethanol ethylene diamine is formed. This reaction product, usually a mixture of the mono- and di-ethanol compound is then reacted to form the nitrile.

Ethanol ethylene diamine acetonitrile is formed by reacting the mono- or di-ethanol ethylene diamine in aqueous solution at ambient temperature, or with cooling, with formaldehyde and HCN. When HCN absorption is about complete the reaction mixture is heated to about 60° C. for 2–3 hours. The synthesis may be represented substantially as follows:

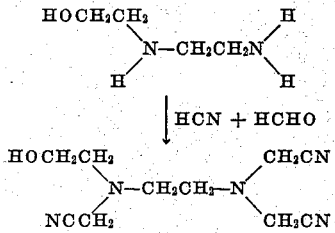

The HCN for the reaction may be formed in solution by using NaCN and HCl. At times Ca(CN)₂ is used as a catalyst.

Since the ethanol ethylene diamine acetonitriles are quite water soluble, the reaction product is not recovered as such, but the reaction mass is merely spray dried. It is also possible to dry the reaction product and simultaneously mix it with the carrier by spraying the solution directly onto the heated comminuted carrier.

Since the polycarboxylic amino acids are capable of dissolving inorganic metal compounds of any degree of insolubility and they are not metabolized, the general rule for their use in accordance with this invention is to use an amount of nitrile, or mixture of nitrile and polycarboxylic acid calculated as polycarboxylic acid sufficient to solubilize an amount of metal useful to the plant during its growing season. Thus, enough to solubilize all metal present in an organic fertilizer would be used in that composition. When using a material such as phosphate rock as the carrier, the plant's needs for phosphoric acid and calcium during the growing season indicate the amount that should be used.

The following example will illustrate the preparation of a phosphate rock fertilizer:

Example 5

| | Parts weight |
|---|---|
| Phosphate rock (approx: Ca₃(PO₄)₂) | 50 |
| Ethylenediamine tetra acetonitrile mixture | 25 |
| Ethylenediamine tetra acetic acid, sodium salt | 25 |

The mixture of nitrile and ethylene diamine tetra acetic acid may be made up as such or it may be in the form of the crude reaction product obtained by partial conversion of ethylene diamine to ethanol ethylene diamine triacetonitrile and also the crude reaction product obtained by carboxymethylation of ethylene diamines with formaldehyde and alkali metal cyanide (i. e., in accordance with my U. S. Patent 2,407,645). The crude nitrile and polycarboxylic acid may be sprayed directly onto the corresponding weight of phosphate rock ground to about 10–100 mesh. By heating the rock to about 75°–100° C. and spraying the hot solution thereon, a partial solubilization occurs in situ and a phosphate rock which will show an appreciable amount of free phosphoric acid is obtained.

The addition of polyamino polycarboxylic acids and/or salts to such minerals activate both the cationic and anionic constituents of the normally insoluble mineral. This action increases the availability of both trace metals and the P₂O₅ portion of the phosphate rock.

Though the invention has been described with reference to only a limited number of examples, it will be understood that variations thereof may be made without departing from the scope thereof.

What is claimed is:

1. A composition for application to soil to induce ammoniation thereof comprising, a solid carrier blended with a compound having the following general formula:

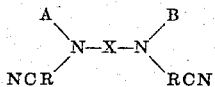

wherein X is an alkylene group which interposes two to three carbon atoms in the chain between the indicated nitrogen atoms; R is chosen from the group consisting of methylene, ethylene, isopropylene, trimethylene; A is selected from the group consisting of —CH₂CH₂OH and longer chain low molecular weight β-hydroxy alkyl groups; B is selected from the group consisting of A, —CH₂COOM, and —RCN; and M is selected from the group consisting of hydrogen, alkali metal and ammonium.

2. The composition in accordance with claim 1, in which the carrier is sand.

3. The composition in accordance with claim 1, in which the carrier is a fertilizer having a moisture content not exceeding 5 percent.

4. The composition in accordance with claim 1, in which the carrier is inorganic material.

5. The composition in accordance with claim 1, in which the carrier is an organic material.

6. The composition in accordance with claim 1, in which the carrier is phosphate rock.

7. A composition in accordance with claim 6, containing about 1 percent to about 50 percent of the said compound blended with the said phosphate rock.

8. The method of ammoniating soil, which comprises applying directly to the soil a composition characterized by its containing a compound corresponding to the following general formula:

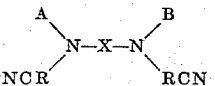

wherein X is an alkylene group which interposes two to three carbon atoms in the chain between the indicated nitrogen atoms; R is chosen from the group consisting of methylene, ethylene, isopropylene, trimethylene; A is selected from the group consisting of —CH₂CH₂OH, and longer chain low molecular weight β-hydroxy alkyl groups; B is selected from the group consisting of A, —CH₂COOM and —RCN; and M is selected from the group consisting of hydrogen alkali metal and ammonium, and working said composition into the soil.

9. The method in accordance with claim 8, in which the composition is contained in a solid carrier.

(References on following page)

References Cited in the file of this patent

UNITED STATES PATENTS

| | | |
|---|---|---|
| 2,205,995 | Ulrich et al. | June 25, 1940 |
| 2,314,091 | Jones | Mar. 16, 1943 |
| 2,407,645 | Bersworth | Sept. 17, 1946 |
| 2,498,480 | Bierlich | Feb. 21, 1950 |

OTHER REFERENCES

Plant Physiology, Jacobson, Maintenance of Iron Supply in Nutrient Solutions—Addition of Ferric Potassium EDTA, April 1951, pages 411–413.

Agricultural Chem. Alexander et al., Control of Iron Chlorosis, July 1952, pages 36–38.

Science, Stewart et al. Chelates as Source of Iron for Plants, November 21, 1952, pages 564–66.